(12) United States Patent
Morrow et al.

(10) Patent No.: US 6,735,721 B1
(45) Date of Patent: May 11, 2004

(54) SYSTEM AND METHOD FOR MESSAGE HANDLING

(75) Inventors: Darin Morrow, Acworth, GA (US);
Mark Kirkpatrick, Conyers, GA (US);
John Stroheyer, Norcross, GA (US);
David Cox, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 657 days.

(21) Appl. No.: 09/598,711

(22) Filed: Jun. 21, 2000

(51) Int. Cl.$^7$ .................................................. G06F 11/00
(52) U.S. Cl. .......................................... 714/57; 714/48
(58) Field of Search ..................... 714/48, 57; 717/125, 717/168; 709/313

(56) References Cited

U.S. PATENT DOCUMENTS

| | | | |
|---|---|---|---|
| 5,121,475 A | * | 6/1992 | Child et al. .................. 715/507 |
| 6,090,154 A | * | 7/2000 | Jeffries et al. ............... 717/125 |
| 6,269,460 B1 | * | 7/2001 | Snover ......................... 714/48 |
| 6,381,736 B1 | * | 4/2002 | Klotz et al. .................. 717/114 |
| 6,526,529 B1 | * | 2/2003 | Miksovsky et al. ........... 714/57 |
| 6,574,792 B1 | * | 6/2003 | Easton ........................ 717/142 |

* cited by examiner

Primary Examiner—Robert Beausoliel
Assistant Examiner—Marc Duncan
(74) Attorney, Agent, or Firm—Shaw Pittman LLP

(57) ABSTRACT

A message handler can dynamically change messages that are output during execution of a computer application. The messages are stored in a message file. When the application begins execution, it opens the message file, extracts the messages, stores them as message entries in a message table in computer memory and closes the file. Message records and message entries have formatting tags that allow dynamic substitution of desired information without expensive recompiling or version releases.

12 Claims, 5 Drawing Sheets

Error in %A, line %L, code %R.

Figure 1A

Error in %A, line %L, code %R, stack %S.

Figure 1B

SYSTEM AND METHOD FOR MESSAGE HANDLING

BACKGROUND

1. Field of Invention

The present invention relates generally to the field of providing informational messages in computer applications. More specifically, the present invention is related to providing dynamic message formatting, to allow flexible messaging without requiring time-consuming recompilations or expensive new version releases.

2. Background of the Invention

A significant problem with conventional application development is managing the text associated with phrasing and punctuation of informational messages, such as error messages, generated by conventional computer systems. The problem is so acute that oftentimes a completely new software release is required for making modifications or additions to error messages. One such fundamental change requiring a new release, for example, is a change in company name because it can require changes to so many messages.

Conventional systems do not allow such changes to be made dynamically. Some conventional systems code the error messages. That is, a particular error is defined by a error message number. The actual text of the error message is stored in an error message database. When a particular error message is required, the application program simply pulls the called for error message from the database. The text of the error message can be changed while it is in the database. However, the text, once changed, remains static. Every time that error message is called for, it prints the same message text. This is undesirable as it is often the case that arbitrarily generated messages are preferred. For example, in application development and maintenance after release, more detailed messages regarding the execution of the application are preferred. However, the release of that application is likely to only provide minimal messaging, as the end user is generally not interested in detail status messages.

SUMMARY OF THE INVENTION

The present invention allows message generation to be performed dynamically, thereby precluding the requirement of hardcoded messages. Preferably, messages are created and stored in a message file. In the preferred embodiment of the present invention, the messages in the message file are loaded into computer memory at runtime to preclude heavy file I/O in the runtime environment.

Formatting tags are provided in the message which act as substitutes for various data to be placed in the message. For example, it might be desirable to place the application name, line number, code segment and status of the stack in the message. An exemplary message form stored in the message file is "Error in %A line %L, code %R stack %S" which would tell the message generator of the present invention to print out a message of the given form with the application name substituted for the %A, line number substituted for the %L, file name of the code segment substituted for the %R and stack status substituted for the %S. Thus, unlike conventional systems there is no predetermined hardcoded message. Rather, messages are built "on-the-fly" using the formatting tags to provide the desired information in the message. Consequently message content can be changed dynamically by changing the formatting tags in a particular message.

The form of the message containing the formatting tags is arbitrary and can be specified by the user in any way desired. In addition, each error message is preferably time stamped and printed with a message number as well as logged. The present invention works for any messages that might be-printed for a system operator including for example, error messages and notification messages.

Thus, one object of the present invention is to allow standard applications to have dynamic messages, such that no software release, i.e., no change in the executable code, is required to change the content of the error message that can be printed out for a given error event.

Another object of the present invention is to allow for generation of dynamic notification messages that inform a system operator of the status of the system or of certain events that happen during an application's execution.

These and other objects of the present invention are described in greater detail in the detailed description of the invention, the appended drawings and the attached claims.

BRIEF DESCRIPTION OF THE DRAWINGS

FIG. 1A is an exemplary message form according to a preferred embodiment of the present invention.

FIG. 1B is a more detailed example of a message according to the preferred embodiment of the present invention.

DETAILED DESCRIPTION OF PREFERRED EMBODIMENTS OF THE INVENTION

Figure 2:
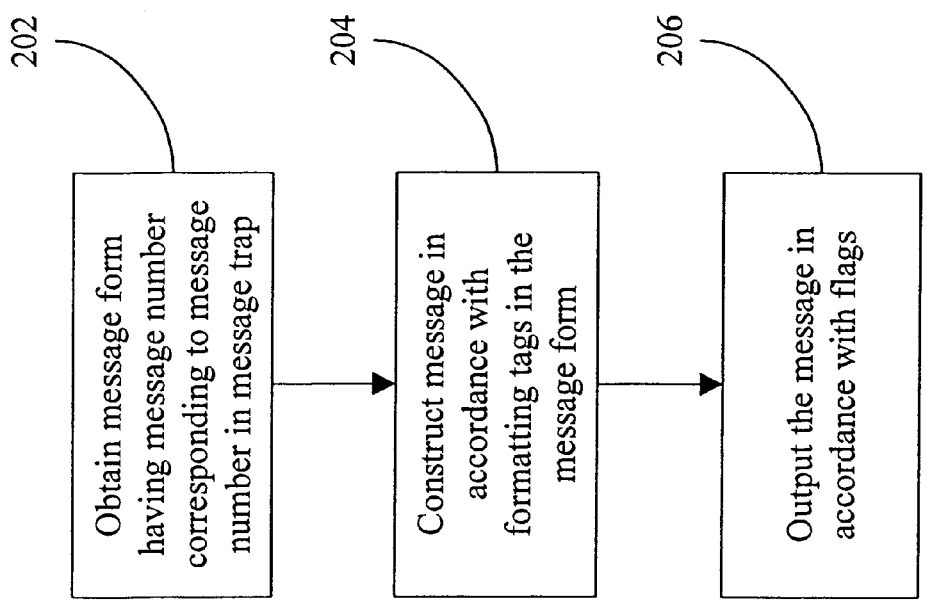
FIG. 2 is a flow chart for a preferred process for processing a message trap according to a preferred embodiment of the present invention.

FIG. 1A is an exemplary message form according to a preferred embodiment of the present invention. The message form is "Error in %A, Line %L, Code %R," and corresponds to an error message. If an error message of this type is actually generated during execution of an application, the application name will be substituted for %A, the line number of the code at which the error occurred is substituted for %L and the error message data is substituted for %R. The message form illustrated in FIG. 1A is a simple one that might be appropriate for use in a production mode, where it is not desired to produce detailed error messages.

However, in a debugging or maintenance environment more detailed information is usually required. For example, a stack dump is often required. In conventional systems this would require either having separate messages or recompiling. Neither solution is optimal. Requiring separate messages is wasteful of space. Recompiling is a long process.

All that needs be done in the preferred embodiment of the present invention to obtain the stack information is to change the form of the message to request the stack information. Referring to FIG. 1B, a modified message requesting the stack information is presented. The message of FIG. 1B, "Error in %A, line %L, code, %R, stack %S," has the same form as the error message shown in FIG. 1A, except that it includes a %S. The %S is a formatting tag that indicates that a stack dump should be provided when the message is encountered. No recompiling of the code is necessary to effectuate the stack dump. Also, it can be seen that the content provided in the error message changes depending on the reason the message was generated.

The level of detail provided in a given error message is user-controlled, as is the form that the error message is written. Both the content and the form can be modified easily without requiring time-intensive recompiling or new software version releases to implement changes to error messages. The formatting tags available in a preferred embodiment of the present invention are provided in Table I.

TABLE I

Formatting Tags

| Formatting Tag | Description |
| --- | --- |
| %A | Name of overall application being executed when message was generated. |
| %F | Name of program file being executed when message was generated. |
| %L | Line number in file being executed when message was generated. |
| %M | The C++ method name or routine name generated by an exception event. |
| %N | The C++ method name or routine name passed to the logging application by a message event. |
| %O | The C++ class name associated with the exception event. |
| %D | Application data passed to the message handler for display in a message. |
| %R | Message identifier. This value determines which message from the table will be displayed. |
| %T | Override message code. Can be coded into application to override messages in message table. Available to allow the application to be in control of message displayed. Changing the value of the data in the message table will have no effect on the message generated by this event. |
| %I | Elapsed time of operation that generated the message. |
| %V | Program version number stored in program for tracing. |
| %W | Output of exception in native format. |
| %S | Output status of stack at time of exception event. |
| %LEV | Severity level - system level output designation that can be overriden by flags field. |
| %TS | Timestamp indicating when an exception event generated the message. This will not necessarily be the time when the error occurred. |
| %d, %s | Standard C++ formatting specifiers. These can be used to display dynamic data values within the error message. The data substitutions for the format specifiers come from the data in the parameters of the C++ exception. |

The forms of the messages are preferably stored in a database in message records (described below). In the preferred embodiment of the present invention, the message records are loaded into a message table at runtime. Each message record is stored as a message table entry. The message table is preferably stored in computer memory. The message table includes one entry per message. The message table can be stored in a number of ways as would be known to those skilled in the art. Preferably, however, due to its ease of indexing, the message table is preferably stored as a hash table. Hashing algorithms are well-known to those skilled in this art.

When a message trap is encountered, a message handler is invoked. The message trap provides the message handler with the message number of the message to use. FIG. 2 is a flow chart illustrating a process executed by the message handler according to a preferred embodiment of the present invention. In step 202, the message handler obtains the message table entry corresponding to the message number passed to the message handler by the message trap. Using the formatting tags contained in the obtained message table entry, the message handler constructs the message by substituting the required information for the formatting tags in step 204. In step 206, the message is output in accordance with the desired destination indicated in the flags field and as indicated by the %LEV parameter. In the preferred embodiment of the present invention, a time stamp is also output with the message. As described below, the time stamp can also be formatted as desired.

As described above, error messages are stored in a database in message records. Preferably message records have the following format:

Message Number | number | severity | flags | message.

The message number field is preferably a number used to identify the message. That is, a certain message is obtained by passing the handler the message number of the desired message. The error number field is generally a code signifying the error. In the preferred embodiment of the present invention it is a code used to reduce the amount of printing required for the error. The severity indicates the importance of the error message, for example, whether the error is catastrophic, or of more informational in nature. The error number and severity field are unique to error messages. As described below, the present invention can be used with any informational message. The flags field indicates the destination of the message. In the preferred embodiment of the present invention, the message can be sent to an error log, presented as a popup on a computer screen or to an operator console. The destinations of the preferred embodiment described herein are not meant to be exhaustive. It would be apparent to those skilled in the art that other destinations for the message can be used within the scope and spirit of the present invention. The message field stores the form of the message, i.e., any formatting tags and associated text as shown, for example in FIGS. 1A and 1B.

In addition, each message can have a timestamp associated with it. Timestamps are printed when the message is printed to indicate the time the message is printed. In the preferred embodiment of the present invention, timestamps have the following format:

TIMESTAMP | Character Count | Sprintf Format.

TIMESTAMP is the word TIMESTAMP to indicate that this line of the file is a TIMESTAMP. Character count is the length of the timestamp in bytes. Sprintf Format is the printing format that the timestamp should take. Sprintf is a well known C construct that would be apparent to those skilled in the art. It is the format that the timestamp will be printed in when the %TS formatting tag is encountered. In the preferred embodiment of the present invention, multiple timestamp formats can be defined that are invoked either by unique names or identification numbers appended to the TIMESTAMP format described above.

In addition to the message and timestamp formats, LEVELs can be defined. Levels are system level definitions that define where messages having a particular %LEV formatting tag are sent for output. %LEV is the level number described below. Levels have the following format:

LEVEL | level number | flags | name.

LEVEL is simply the word LEVEL to indicate that this line in the file is a LEVEL line. Level number identifies the level. In the preferred embodiment of the present invention, level number is an integer from 1 to 9. Alternate embodiments can have any number of levels. The flags field preferably takes on the value on, off or nolsm (indicating do not output to the log service manager).

Comments are embedded comments that can be used to describe the file or the message. In the preferred embodiment of the present invention, comment lines are identified in the file with a "#" as the first character of the line.

Figure 3:
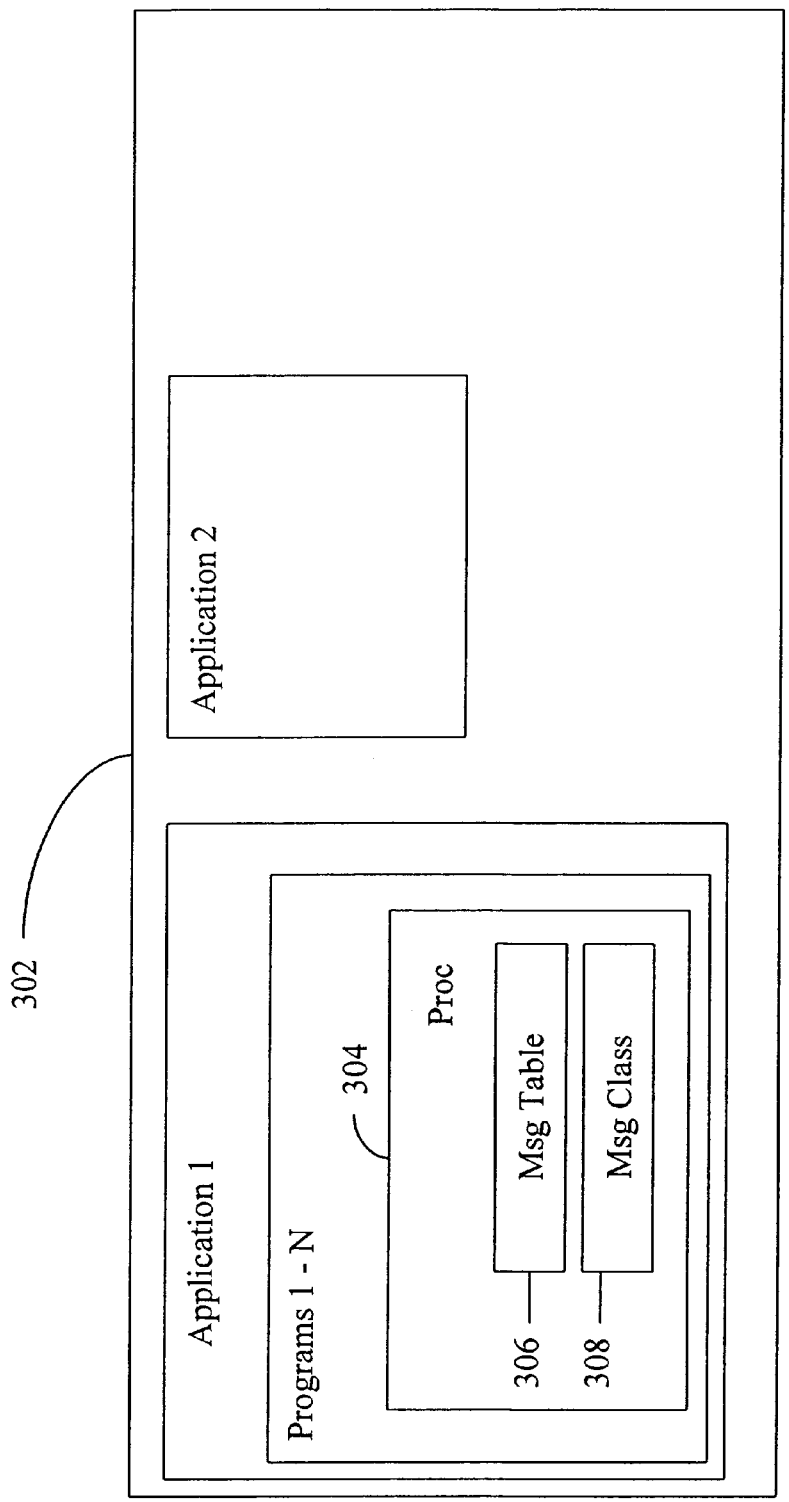
FIG. 3 illustrates schematically an architecture in which the preferred embodiment of the present invention operates.

FIG. 3 is a software architecture for a system according to a preferred embodiment of the present invention. Referring to FIG. 3, a host computer 302 has a number of applications, e.g., application 1 and application 2. Each application has a number of programs executing in it, for example programs 1–N in application 1. The programs are running processes and there can be multiple instances of a single process running at a time. One example of such a process is process 304. Each process has available to it a message table 306 and a message class 308.

Message table 306 is preferably identified as a command line parameter entered in the command line when the process or application is started. Message table 306 is identified by identifying the file name of the file containing the form records for the message as described above. Entering the table as a command line parameter provides flexibility for providing different message tables as desired.

Once the messages are placed in memory, they cannot be modified. That is, the messages are no longer dynamic, unless a process is built in whereby they can be changed. For example, the file could be modified as desired and the process restarted, thereby reloading the table. Alternatively, a signaling mechanism can be used to instruct the process to reread the message file when it has changed, to maintain synchronization between the messages stored in memory and the messages stored in the file. The signaling approach is described in more detail below. In an alternative preferred embodiment, the file is not stored in memory to facilitate changes. This embodiment suffers from a slower access time, and could have detrimental effects on system performance if a significant number of message invocations are experienced.

Each process also contains a message handler, message class 308 that contains a group of routines to manipulate messages. Table II provides a list of names and descriptions of routines that are included in message class 308 according to a preferred embodiment of the present invention.

TABLE II

Message Class Routines

| Routine | Description |
| --- | --- |
| load_msg | load_msg is an initialization routine used to read messages from the message file and store them in memory in a message table described above. |
| renew_msg | renew_msg is performed by a signal handler to update a message by rereading it from the message file, and then replacing the reread message in the message table in memory. |
| get_msg | get_msg is the event that is executed when a message trap occurs. get_msg gets a message from the message table stored in memory, based on the message number. |
| fmt_msg | fmt_msg builds a message in accordance with its form and associated formatting tags. |
| put_msg | put_msg outputs the message in accordance with the level and flag formatting tags. It can put the message to a file, printer, etc. |
| proc_msg | proc_msg processes messages. It is a combined get_msg, fmt_msg and put_msg. Thus, invoking proc_msg first obtains a message using get_msg, builds it using fmt_msg, and then outputs the message using put_msg. |

Figure 4:
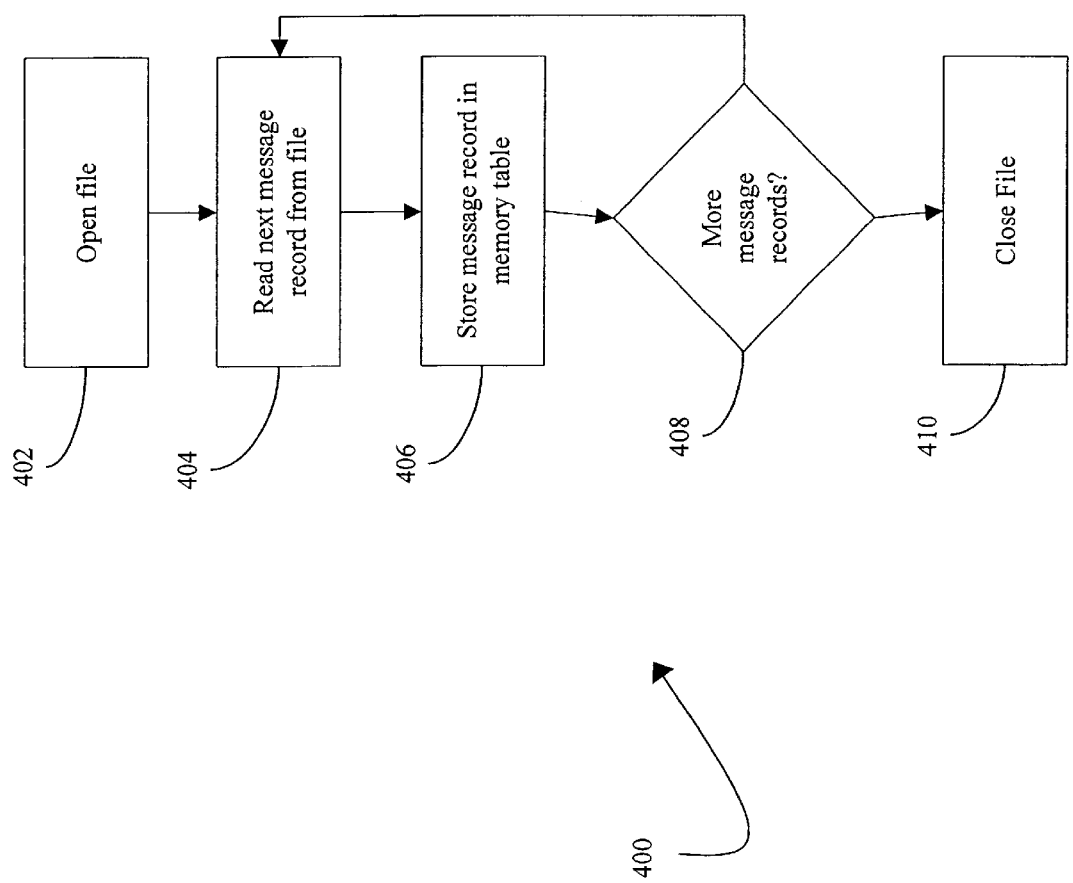
FIG. 4 is a flow chart for a process for initializing a message table according to a preferred embodiment of the present invention.
Figure 5:
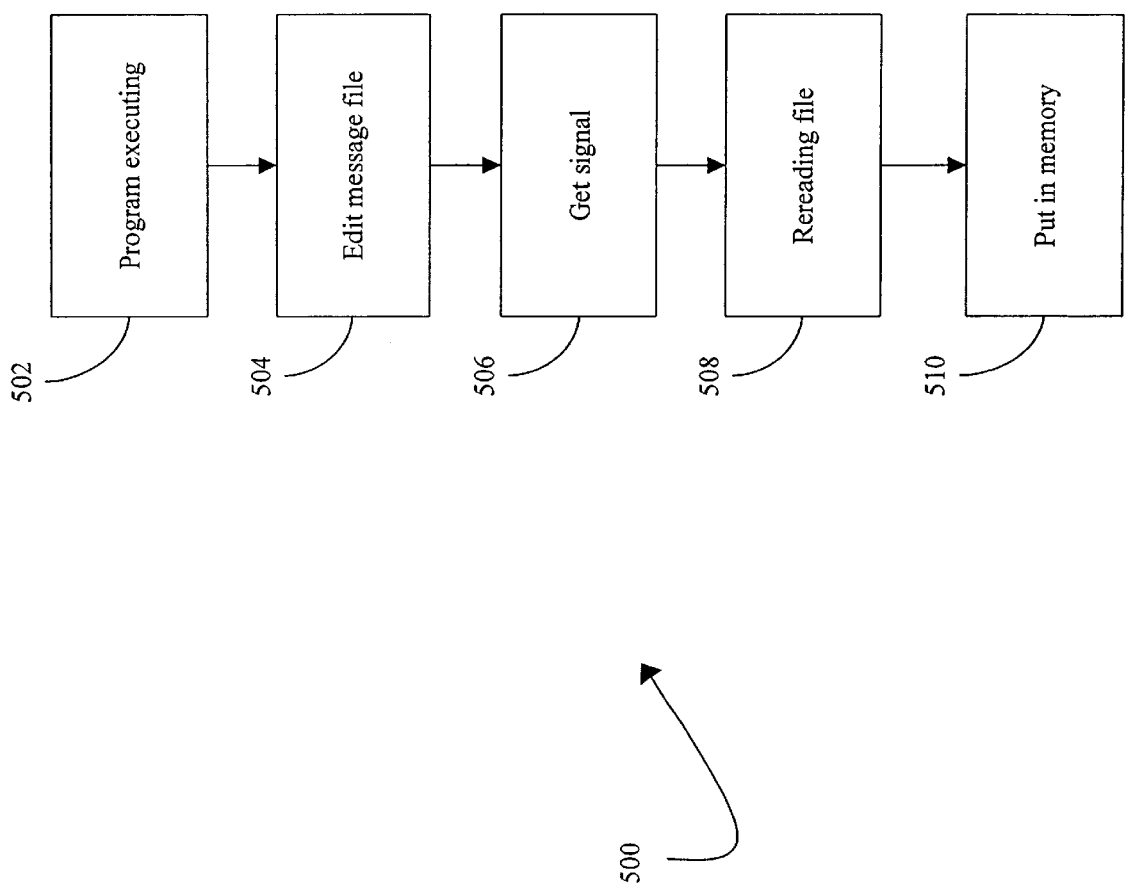
FIG. 5 is a flow chart for a process for updating messages according to a preferred embodiment of the present invention.

FIGS. 4–5 illustrate the various phases of message handling according to a preferred embodiment of the present invention. Referring to FIG. 4, initialization process 400 is described with reference to the flow chart shown. Process 400 assumes that a file of message records, for example error messages, has been created as described above. The creation of such a file would be well known to those skilled in the art in the light of the disclosure contained herein. Process 400 begins in step 402 where it opens the message file. Process 400 reads the next message record from the message file in step 404, and stores it in a message table in memory as described above in step 406. In step 408, process 400 determines if there are more message 10 records in the message file. If there are, process 400 continues in step 404 by reading the next message. If there are no more messages in the message file, process 400 closes the message file in step 410 and ends.

FIG. 5 illustrates a flow chart for a process 500 for amending the message table in memory using signaling techniques according to a preferred embodiment of the present invention. In step 502 and application is executing. In step 504, one or more message records in a message file are edited. In step 506 a reread signal is generated that is detected by the executing application. The reread signal is issued by the operating system for the system on which the application is executing. Such signaling is well known to those skilled in the art. Upon detecting the reread signal, a message handler is invoked that rereads the message file in step 508. While the whole message file can be reread using, for example, the load_msg routine, in the preferred embodiment only the messages that were actually edited are read. The messages that are read replace the corresponding message in the message table loaded into memory.

The present invention can be applied to any types of messages for which the ability to dynamically change the content of the message might be desirable. For example, error messages (discussed above) and system notification messages can be processed according to the present invention. Forms for these messages having the desired formatting tags can be developed, stored in a database and loaded into a runtime table for use during the execution of the application to which they apply.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for dynamically providing a message during the execution of a computer application comprising:
    a computer on which the application executes;
    a message file containing at least one message record on the computer the message record comprising:
        a message number field;
        an error number field;
        a severity field;
        a flags field; and
        a message field;
    a message handler executing on the computer, the message handler comprising:
        an initialization process which, when the application is started, opens the message file to obtain the message record, and stores the message record as a message entry in a message table stored in a memory of the computer, and then closes the message file;

a get process to get the message entry the message table when a message trap occurs during execution of the application, a format process to generate the message in accordance with the message entry; and an output process to output the message.

2. The system recited in claim 1, wherein the format process formats a timestamp in accordance with a timestamp format and the output process outputs the formatted timestamp along with the message.

3. The system recited in claim 1, wherein the output process outputs the message to a device corresponding to a predetermined destination based on a level of the message.

4. The system recited in claim 1, wherein the message is an error message.

5. The system recited in claim 1, further comprising an update process to update the message table when a change is made to the message file.

6. The system recited in claim 5, wherein said update process uses operating system generated signals to initiate the updating of the message table.

7. The system recited in claim 1, wherein the message field contains one or more formatting tags.

8. A method for dynamically providing a message during execution of a computer application, comprising:

storing at least one message record in a message file, the message record comprising:
a message number field;
an error number field;
a severity field;
a flags field; and
a message field;

opening the message file to obtain the message record;

storing the message record as a message entry in a message table stored in a computer memory;

closing the message file;
encountering a message trap;
obtaining a message entry from the message table when the message trap is encountered;
generating the message in accordance with the obtained message entry; and
outputting the message.

9. The method recited in claim 8, further comprising of updating the message table when a change is made to the message file.

10. The method recited in claim 9, further comprising using operating system generated signals to initiate updating of the message table.

11. The method recited in claim 8, further comprising:

formatting a timestamp in accordance with a timestamp format; and outputting the timestamp along with the message.

12. The method recited in claim 8, wherein the message field contains formatting tags.

* * * * *